US011046790B2

(12) United States Patent
Vähäsalo et al.

(10) Patent No.: US 11,046,790 B2
(45) Date of Patent: Jun. 29, 2021

(54) METHOD OF PRODUCING HEMICELLULOSE EXTRACTS

(71) Applicant: CH-Bioforce Oy, Espoo (FI)

(72) Inventors: Lari Vähäsalo, Espoo (FI); Nicholas Lax, Espoo (FI); Sebastian Von Schoultz, Espoo (FI)

(73) Assignee: CH-Bioforce Oy, Espoo (FI)

( * ) Notice: Subject to any disclaimer, the term of this patent is extended or adjusted under 35 U.S.C. 154(b) by 30 days.

(21) Appl. No.: 16/090,221

(22) PCT Filed: Mar. 29, 2017

(86) PCT No.: PCT/FI2017/050222
§ 371 (c)(1),
(2) Date: Sep. 29, 2018

(87) PCT Pub. No.: WO2017/168051
PCT Pub. Date: Oct. 5, 2017

(65) Prior Publication Data
US 2019/0112395 A1    Apr. 18, 2019

(30) Foreign Application Priority Data

Mar. 29, 2016  (FI) ...................................... 20165264

(51) Int. Cl.
*C08B 37/00* (2006.01)
*C08L 5/14* (2006.01)
*B01D 61/14* (2006.01)
*B01D 61/16* (2006.01)
*C08H 8/00* (2010.01)

(52) U.S. Cl.
CPC ........ *C08B 37/0003* (2013.01); *B01D 61/145* (2013.01); *B01D 61/16* (2013.01); *C08B 37/0057* (2013.01); *C08H 8/00* (2013.01); *C08L 5/14* (2013.01)

(58) Field of Classification Search
None
See application file for complete search history.

(56) References Cited

U.S. PATENT DOCUMENTS

| 4,584,076 A * | 4/1986 | Edel | D21C 11/0042 |
| | | | 205/413 |
| 5,504,196 A * | 4/1996 | Clarke Garegg | C13B 20/14 |
| | | | 127/34 |
| 5,865,898 A * | 2/1999 | Holtzapple | C01F 11/18 |
| | | | 127/37 |
| 2009/0261041 A1 * | 10/2009 | Hu | B01D 37/025 |
| | | | 210/665 |
| 2009/0305374 A1 | 12/2009 | Retsina | |
| 2010/0331560 A1 | 12/2010 | Borden | |
| 2012/0196233 A1 | 8/2012 | Yonghao et al. | |
| 2014/0158642 A1 * | 6/2014 | Minamino | C08L 5/14 |
| | | | 210/767 |
| 2014/0209259 A1 * | 7/2014 | Li | D21B 1/14 |
| | | | 162/9 |
| 2015/0184345 A1 | 7/2015 | Nelson et al. | |
| 2016/0083808 A1 * | 3/2016 | Ramarao | C12P 7/10 |
| | | | 435/160 |

FOREIGN PATENT DOCUMENTS

| CN | 103924468 A | 7/2014 |
| CN | 102585039 B | 11/2014 |
| EA | 5492 B1 | 2/2005 |
| EP | 2336196 A1 | 6/2011 |
| SU | 506612 A1 | 3/1976 |
| WO | WO2014124321 A1 | 8/2014 |
| WO | WO2015100445 A1 | 7/2015 |

OTHER PUBLICATIONS

Canilha et al: Clarification of a wheat straw-derived medium with ion-exchange resins for xylitol crystallization. Journal of Technology and Biotechnology, Jan. 1, 2008, vol. 83, No. 5, pp. 715-721.
Makishima et al: Development of continuous flow type hydrothermal reactor for hemicellulose fraction recovery from corncob. Bioresource Technology., Feb. 11, 2009, vol. 100, No. 11, pp. 2842-2848.
Soto et al: Recovery, concentration and purification of phenolic compounds by adsorption: a review, Journal of Food Engineering, Barking, May 2, 2011, vol. 105, No. 1, pp. 1-27.
Shen: A combined process of activated carbon adsorption, ion exchange resin treatment and membrane concentration for recovery of dissolved organics in pre-hydrolysis liquor of the kraft-based dissolving pulp production process. Bioresource Technology, 2013, vol. 127. pp. 59-65, http://dx.doi.org/10.1016/j.biortech. Oct. 17, 2012.

* cited by examiner

*Primary Examiner* — Dale R Miller
(74) *Attorney, Agent, or Firm* — Laine IP Oy

(57) ABSTRACT

This invention describes a method for the purification of a hemicellulose extract produced for example through hot water extraction. Such extracts often contain large amounts of colloidal material which primarily consists of lignin and other phenolic compounds. These colloidal particles clog equipment such as ultrafiltration membranes, which deem the use of such equipment almost impossible. The unwanted material is very tacky at temperatures between 70 and 120° C. which makes it possible to adsorb it onto a variety of materials. Further, by using an adsorbing material that is wholly or partly contaminated with chemically alike material the purification process is greatly enhanced.

21 Claims, 3 Drawing Sheets

METHOD OF PRODUCING HEMICELLULOSE EXTRACTS

TECHNICAL FIELD

The present invention relates to the production of hemicellulose extracts. In particular the present invention concerns a method of producing hemicellulose-containing aqueous compositions that are essentially free from turbidity causing components.

BACKGROUND ART

Hemicellulose extracts can be produced through pressurized hot water extraction (WO2014009604, WO2009122018 and Leppainen et al.). In such methods hemicelluloses are extracted by contacting a hemicellulose containing raw-material with water at temperatures of up to 160° C. to provide hemicellulose extracts in the form of aqueous streams containing the dissolved hemicelluloses. It is also possible to obtain hemicellulose rich aqueous streams by using other aqueous media, such as steam, as an extractant.

The consistency of the hemicellulose extracts is of utmost importance for the economy of a hemicellulose extraction process. Transport costs and further derivatization of dilute extracts are costly and in many cases impossible to perform in an economically sound manner. Hemicellulose extracts are therefore frequently concentrated before they are subjected to further treatment. One technique for concentrating hemicellulose extracts is to use a filter system where water and other low molar mass components are filtered out as an effluent and the hemicelluloses having a higher molar mass are retained and concentrated.

However, hemicellulose extracts are frequently turbid. The extracts contain particles which may be colloidal or smaller. It has been found that they are typically tacky to the degree where a film of deposit is formed on surfaces, such as filter surfaces. These colloidal particles have the ability to clog the filters and e.g. for this reason flux and capacity of a filter is significantly reduced when turbid hemicellulose extracts are filtered. The presence of colloidal particles is therefore one of the main reasons for impaired ability to use filtration techniques such as ultra-filtration for increasing the dry content of the hemicellulose extract Further, it has been found that the main fouling components are lignin and other polyphenols. Since these components have some anti-microbial properties, extracts of hemicellulose containing turbidity causing components are commonly found to be unsuitable for fermentation purposes.

US Published Patent Application No. US2015376834 discloses a method of reducing the formation of precipitates, such as lignin precipitates, during water extraction of lignocellulosic compounds. The method comprises addition of between 1 and 50 g/l of formic acid to a sample of biomass prior to or substantially concurrently with a hot water extraction of the lignocellulosic compounds. Formic acid is a corrosive agent and the high temperatures and pressures used during hot water extraction will aggravate the risk of corrosion of the equipment, such as pressure vessels used for extraction.

SUMMARY OF INVENTION

Technical Problem

There is a need to provide a novel method of producing hemicellulose extracts which are free or essentially free from components which hamper filtration of the extracts.

In particular there is a need for a method of reducing turbidity of hemicellulose containing aqueous streams obtained by extraction using hot water or steam without the use of chemical substances and other components which may cause corrosion to the processing equipment used for the extraction.

Solution to Problem

In the present invention it has been found that the removal of particles which clog filters and membranes can be performed efficiently by taking advantage of the tackiness of the colloidal material. The tackiness is manifested at temperatures of about and below 120° C.

Thus, according to the present invention an aqueous stream containing dissolved hemicelluloses and dispersed colloidal substances obtained from extraction of biomass with an aqueous medium is treated by
- adjusting the temperature of the aqueous stream to a temperature of 120° C. or less; and
- contacting the aqueous stream with a material capable of adsorbing dispersed colloidal substances, so as to provide an aqueous solution of hemicelluloses, having low levels of residual turbidity.

In embodiments, by the presented process, residual turbidity of the aqueous stream can be lowered to below 200 NTU, measured at room temperature.

More specifically, the present invention is mainly characterized by what is stated in the characterizing part of claim 1.

Advantageous Effects of Invention

Considerable advantages are obtained by the invention. Thus, the efficient removal of the turbidity causing particles facilitates the use of filtration for the concentration of the extract with minimal clogging problems of the filters and in particular filter membranes. In addition the hemicellulose content of the extract increases significantly since most material in the turbidity causing particles are not hemicelluloses.

A hemicellulose extract which is obtained from extraction of hemicellulose containing material has a typical turbidity of 2000 NTU, whereas an extract which has gone through an adsorption process of the present kind at temperatures below 120° C., for example between 120-70° C., has a typical turbidity below 40 NTU.

The method does not require the addition of corrosive agents, such as organic carboxylic acid, and thus there is no need for modifying the extraction process or extraction equipment. In the present context it has been found that although other parameters, such as molar mass, pH and salinity, may also be considered when examining solubility of turbidity forming material, temperature is of particular importance since the material of the extract is soluble at temperatures above ca 120° C. Further, when the material is efficiently collided with an adsorbing material and, at the same time, the temperature is reduced below the tackiness point of the formed particles, deposition of the material is enhanced.

The adsorbent material can be reused, and in fact, as will be discussed below, the use of an adsorbent having a surface at least partially covered with precipitated colloidal material is advantageous since such a material will have very good adsorption properties, as will be explained below.

In one embodiment, the present method is used for treating an aqueous composition withdrawn from a prehydrolysation step of a conventional pulping process. Such a prehydrolysate effluent can be subjected to a treatment in which the temperature of the prehydrolysate is first increased, for example to above 120° C., to solubilize lignin, which is then precipitated upon an adsorption material. Alternatively, the prehydrolysate effluent can be recovered at a temperature of more than 120° C. and the lignin then subsequently precipitated upon an adsorption material from such an effluent.

Further advantages and features of specific embodiments will become apparent from the following detailed description of embodiments.

DESCRIPTION OF EMBODIMENTS

Figure 1:
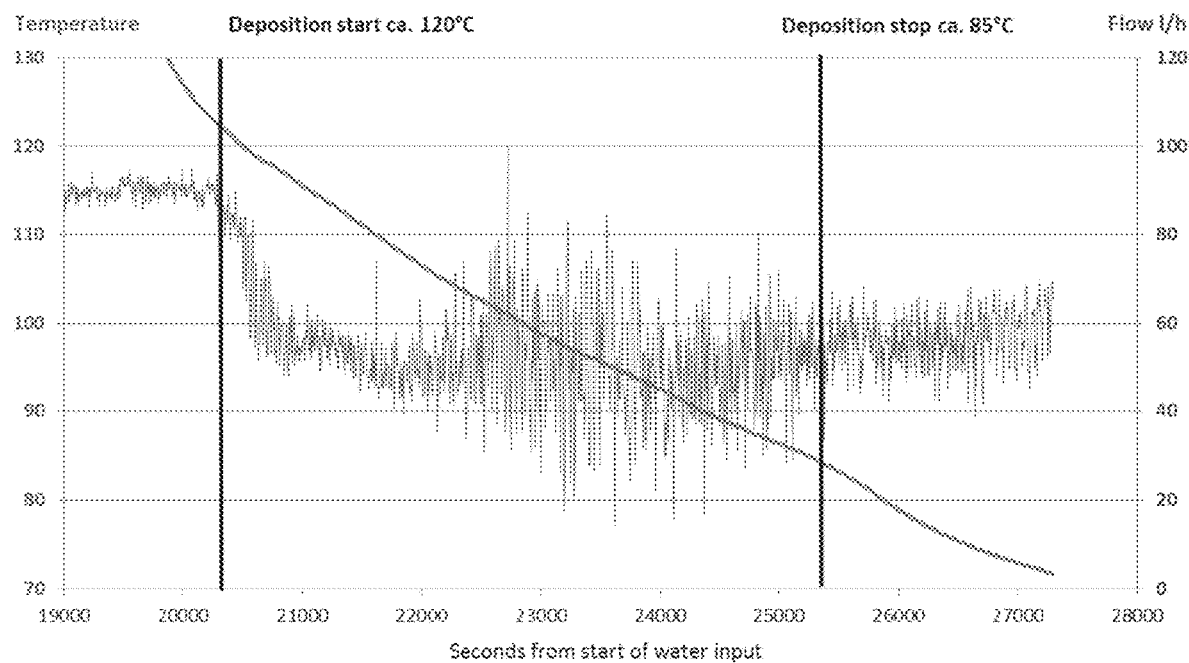
FIG. 1 shows the reading from a flow meter as a function of time.

In the present context, the term "NTU" is an abbreviation for "Nephelometric Turbidity Units" which is a measure for units of turbidity obtained by a calibrated nephelometer. The NTU values given in the present context are all indicated at room temperature (25° C.) using Standard ISO 7027.

In the present context, hemicelluloses are extracted from biomass using an aqueous medium. The aqueous medium can comprise a medium selected from water, aqueous solutions, steam, superheated steam and mixtures thereof.

In one embodiment, biomass is contacted with water at a temperature in the range of, generally, 70-250° C., in particular 110-250° C. Typically, the maximum temperature is limited to 170° C., or even 160° C. The hot water extraction is typically carried out at an absolute pressure in excess of 1 bar, typically 1.1 to 15 bar absolute pressure, for example 1.5 to 10 bar(a). The abbreviation "bar (a)" is used for designating the unit "bar absolute pressure".

According to one embodiment of the invention the reaction mixture is kept at or heated to a temperature of 120-200° C., for example a temperature of >120° C. up to 200° C., more preferably 135-170° C., such as about 140-160° C.

Typically, hemicelluloses are extracted from the biomass in a vessel, in particular a closed vessel, which is also referred to in the following as a "reactor vessel". Thus, in one embodiment, which can be combined with the above embodiments, hemicelluloses are extracted from the biomass at a pressure of 3-8 bar (a), in particular 5-7 bar (a). In an embodiment, the environment in the reactor vessel is starved from oxygen. This means that the amount of oxygen in the reactor vessel is preferably under 0.01 kg oxygen/kg aqueous solution in the vessel, more preferably under 0.005 kg oxygen/kg aqueous solution in the vessel, even more preferably under 0.0001 kg oxygen/kg aqueous solution in the vessel.

Suitable methods of producing hemicellulose extracts are disclosed in WO2014009604, WO2009122018 and Leppanen et al.

The term "biomass" designates materials, which contain carbohydrates. In particular "biomass" stands for lignocellulosic materials which comprise cellulosic fibers, carbohydrates, such as hemicelluloses, and lignin and optionally various organic compounds, also referred to as extractives.

Typically, the biomass is selected from the group of wood-based materials and non-wood materials. Examples include raw-material formed by or derived from annual and perennial plants, wood and peat, and cellulosic materials such as natural fibres rich in cellulose and hemicellulose.

According to one embodiment, the raw-materials formed by or derived from annual and perennial plants are exemplified by bamboo, bagasse, hemp, wheat and rice straw.

According to another embodiment, wood based materials are represented by materials obtained from trees of the genera Pins, such as pine (*Pinus svlvestris*), *Betula*, such as birch (*Betula pendula*), *Picea*, such as spruce (*Picea abies*), *Populus*, such as poplar (*Populus alba* or *Populus nigra*) or aspen (*Populus tremula*).

The particle size or chip size of the biomass is not critical as such. However, the more finely divided the raw-material is, the more readily will the hemicellulose be extracted from the raw-material.

Based on the foregoing, in one embodiment, biomass in the form of particles having a smallest dimension of less than 10 mm are used. Thus, in the case of chips, such as wood chips, a thickness of less than 10 millimeters is preferred.

Naturally, it is possible to crush or comminute the biomass particles or chips by conventional crushing or milling equipment, such as using hammer mill, pin mill or the like.

As discussed above, by extracting hemicelluloses from a raw-material comprising hemicelluloses by contacting the raw-material with an aqueous medium, such as water or steam or combinations thereof, at a temperature of up to 160° C., typically 130 to 160° C., a hemicellulose extract is produced in the form of an aqueous stream containing dissolved hemicelluloses and dispersed colloidal substances.

The term "aqueous stream" stands for a composition of water or an aqueous solution.

The aqueous stream containing dissolved hemicelluloses and dispersed colloidal substances, in the following also called "hemicellulose extract", contains typically dissolved hemicelluloses selected from the group of xylanes, such as glucuronoxylans, arabinoxylans, glucomannans, xyloglucans and mannans and combinations thereof.

Typically, the aqueous stream contains 0.01 to 20 wt-% of dissolved hemicelluloses.

In the present context it has been found that the hemicellulose extracts have very low turbidity at temperatures higher than 120° C., since virtually all components are dissolved and present in solution. However, upon lowering of the temperature of the hemicellulose extract, particles are formed which increase the turbidity of the extract.

These often colloidal particles or aggregates consist of hemicellulose, lignin, extractives and other components. Such particles begin to form at temperatures below 120° C.

Embodiments of the present invention are based on the surprising finding that the particles causing the turbidity and hence clogging of filters are tacky and will be precipitated and adsorbed onto surfaces efficiently by lowering the temperature of hemicellulose solutions obtained by extraction of hemicellulose raw-materials at the above mentioned conditions.

Thus, by contacting the aqueous stream with a material capable of adsorbing dispersed colloidal substances, an aqueous solution of hemicelluloses is obtained which is freed from dispersed colloidal substances.

In particular, the aqueous stream is contacted with a material capable of adsorbing dispersed colloidal substances so as to provide an aqueous solution of hemicelluloses, having a residual turbidity, measured at room temperature, of below 200 NTU. In particular by contacting at temperatures of or preferably below 120° C. an aqueous stream with an adsorption surface, turbidity causing components will be removed to the extent that an aqueous solution of hemicelluloses is achieved having a residual turbidity, measured at room temperature, of below 100 NTU, preferably below 50 NTU.

In one embodiment, the present method is carried out without the addition of any components which adjust the pH of the aqueous stream.

In one embodiment, in order to enhance adsorption of the turbidity causing components, the pH of the aqueous stream is lowered before or during the step of contacting the aqueous stream with the material which is capable of adsorbing dispersed colloidal substances. In particular the pH is adjusted to a value of less than 10, in particular less than 9, for example to less than 8, such as less than 7 or less than 6. Lowering of the pH increases the rate of deposition of the unwanted material.

Preferably the pH is lowered using $CO_2$ as the gas can partly be reused. However, the pH lowering acid can also be an organic or a mineral acid. Preferably non-corrosive acids or acid compounds are employed.

In one embodiment, the aqueous stream containing dissolved hemicelluloses and dispersed colloidal substances is contacted with a material capable of adsorbing dispersed colloidal substances at turbulent flow conditions. During such conditions, adsorption is particular efficient.

The adsorption material exhibits surfaces capable of adsorbing the turbidity causing components of the aqueous stream obtained from hemicellulose extraction.

In one embodiment, the adsorption material is selected from the group of biomass, such as wood or peat, preferably in finely divided form, such as saw dust, lignocellulosic and cellulosic pulp, paper and paperboard optionally in shredded or finely divided form, mineral particles, polymeric particles, such as plastic particles, and non-porous materials having smooth or preferably rough surfaces, such as plates, for example planar plates, of metal, glass or polymer material.

In one embodiment the adsorption material is a synthetic matrix with similar chemical properties as the material being deposited.

In one embodiment, the adsorbing material has a porous matrix, preferably exclusively a porous matrix.

In one embodiment, the specific surface area of the adsorption material, for example of the porous matrix is for example 10 $m^2/g$ or more.

To enhance adsorption, in one embodiment, the adsorbing material is configured to a three-dimensional construction having a specific surface area of at least 50 $m^2/m^3$.

Thus, one particular embodiment comprises
  contacting the aqueous stream with a material having a specific surface area of at least 10 $m^2/g$, or
  contacting the aqueous stream with a three-dimensional construction having a specific surface area of at least 50 $m^2/m^3$, or
  a combination of both.

In a particular embodiment, the aqueous stream containing dissolved hemicelluloses and dispersed colloidal substances is contacted with a material comprising colloidal substances deposited on at least a part of its surface. It has been found that by the use of an adsorbing material, which has previously deposited turbidity causing material on it, the removal rate is greatly increased.

Thus, in one embodiment the adsorption material is used several times, in particular 2 to 25 times, in particular 3 to 20 times, for consecutive purification batches. Adsorption material already used for the purification or removal of turbidity causing material has an enhanced ability to purify a new batch of hemicellulose extract.

In order to achieve proper precipitation of the turbidity causing components, the temperature of the aqueous stream is adjusted to a temperature in the range of 0 to 120° C., in particular to a temperature in the range of 10 to 120° C., for example 20 to 120° C., such as 50 to 120° C.

In one embodiment, temperature of a hemicellulose extract is lowered over the range from 120° C. to 85° C. or 120° C. to 80° C. or 120° C. to 70° C.

Typically the end point of the precipitation procedure is below 100° C., in particular below 85° C., for example in the range of 80 to 60° C.

In one embodiment, precipitation is reached by lowering the temperature to 120 or less, without the use of precipitation chemicals.

In one embodiment, separation of dispersed colloidal substances is achieved or is enhanced by subjecting the substances to centrifugal forces. Thus, in one particular embodiment, an aqueous stream containing dissolved hemicelluloses and dispersed colloidal substances are conducted to a centrifuge wherein the colloidal substances are separated from the solution and adsorbed onto a surface primarily due to centrifugal forces. Typically, the centrifugal forces are in the range of 100×g to 100,000×g, for example 500×g to 50,000×g.

In one embodiment, an agent enhancing precipitation of colloidal substances is added to the aqueous stream. In particular an agent enhancing precipitation of colloidal substances is added to the aqueous stream before or during the step of contacting the aqueous stream with the material capable of adsorbing dispersed colloidal substances.

Examples of agents enhancing precipitation of colloidal substances include aluminium sulphate, iron (III) sulphate, aluminium sulphate, Polydadmac (i.e. polydiallyldimethylammonium chloride), polyamines, bentonite and mixtures thereof.

Further components that can be added to the aqueous stream containing dissolved hemicelluloses and dispersed colloidal substances include chelating agents, such as EDTA, DTPA, NTA and acid capable of chelation, such as oxalic acid In one embodiment, a chelating agent is added at temperatures around or above 100° C., at which temperatures the organic material is soluble and the reaction between metals and chelating agents is most efficient.

Generally, agents enhancing precipitation of colloidal substances are added in amounts of 0.01 to 25%, in particular 0.1 to 10% by weight of the total weight of the aqueous stream.

In one embodiment, to achieve efficient adsorption of the colloidal material and utilizing the tackiness of the material, the temperature of the aqueous stream is adjusted to a value in the range of approximately 70-120° C. In one embodiment, the hemicellulose extract is conducted through a layer of finely divided wood particles, such as wood chips or saw dust, within the temperature range 70-120° C. in order to produce a final cooled extract having a low degree of turbidity.

A particular advantage of performing the deposition of the turbidity causing material in the temperature range of 70-120° C. is that there is no removal of hemicelluloses from the extract.

As shown in Example 4 below, in an embodiment low pH values (pH below 3) are avoided. One reason, although this is just one possible explanation, is that deacetylation will start and release acetic acid which further lowers the pH. Deacetylation also lowers the water solubility of hemicelluloses lowering the total extraction yield of hemicelluloses. Too low pH may also case the formation of furfural or hydroxymethylfurfural.

Traditionally micro—of ultrafiltration is used for the removal of colloidal material from hemicellulose extracts in order to make a filtration with smaller filter pores possible without clogging the filters. A pre-filtration process often also retains much of the hemicelluloses since these are to some extent adsorbed to the particles being removed or are larger than the cut-off of the filter. In any case the method also lowers the yield of hemicelluloses. With the described invention this step becomes unnecessary since the turbidity causing material is removed before any filtration is performed.

Figure 4:
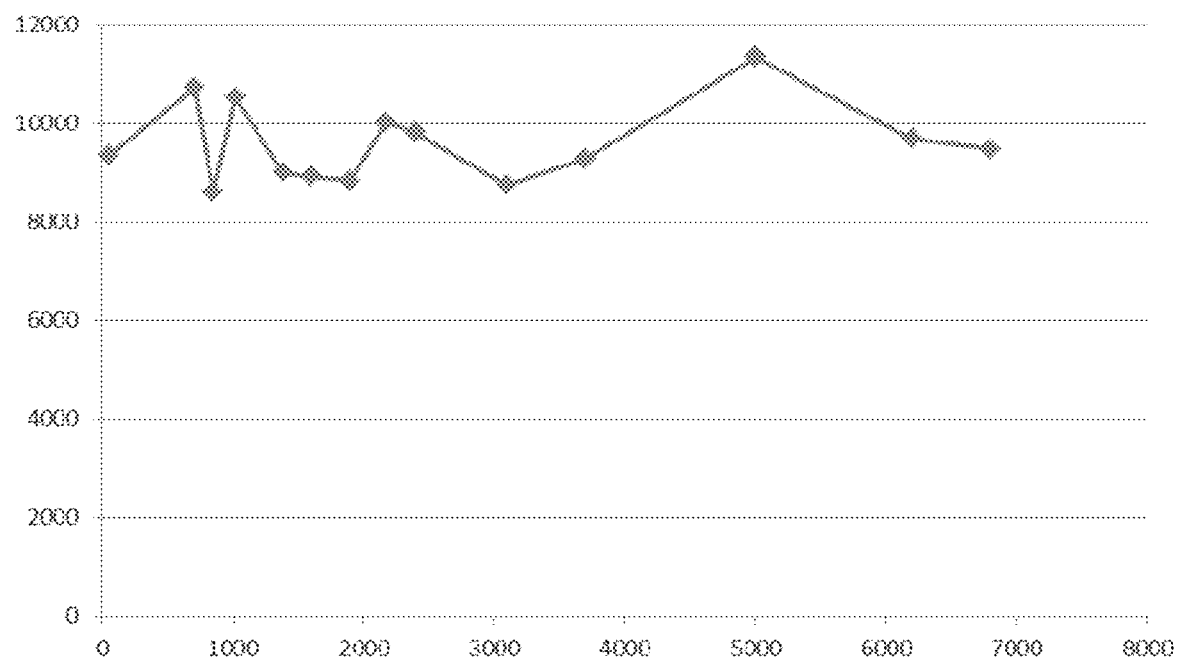
FIG. 4 shows the hemicellulose content of the extract at different NTU values.

As shown in FIG. 4 the hemicellulose concentration is not lowered during the clarification process. The extract can be clarified practically totally pure from material which clogs the filters/membranes. Without the clarification step filtration procedures become extremely complicated due to clogging and lignin contaminations present in each fraction.

The deposited material during clarification is typically composed of lignols (low molar mass lignin), lignans and to some extent lipophilic extractives. Lignols and lignans can be extracted from the adsorbing material by washing the material with water or steam at temperature above 120° C., preferably 130° C. The adsorbing material can also be extracted at lower temperatures with for example alkaline water, methanol, ethanol, acetone, ethyl acetate. The recovered material can be used as an antioxidant or any other uses such as a glue, plasticizer, etc.

In one embodiment the hemicellulose extract is circulated through the biomass, such as a volume of wood chips while the temperature of the extract is optionally lowered. The temperature of the extract is thus lowered until a predetermined residual turbidity of the hemicellulose extract in the range of less than 200 NTU, measured at room temperature, is reached. That residual turbidity is typically reached when the temperature of the extract is or has been lowered to below 50° C.

In another embodiment the hemicellulose extract is taken out from the hemicellulose extraction vessel and circulated through an external adsorbing material, such as biomass, plastic or mineral particles, which biomass is different from the biomass from which the hemicelluloses were extracted.

The present method is typically carried out at ambient pressure or at a pressure corresponding to the boiling temperature of the aqueous phase of the aqueous stream. The latter alternative is particularly applicable when operating the method at a temperature above 100° C. Generally, the pressure can be in the range of 0.1 to 5 bar (a), in particular about 0.7 to 2.5 bar (a), for example 1 to 2 bar (a).

The adsorbing material can then be purified through washing. Washing can be carried out for example with steam or hot water or combinations thereof. Washing can also be carried out with an organic solvent such as ethanol, acetone, ethyl acetate, etc. or by an alkali such as sodium hydroxide as well as by combinations thereof.

In one embodiment, a hemicellulose extract is provided having a high purity. In particular, in respect of the dry matter content of the aqueous stream, the concentration of hemicelluloses is 80% by weight or more, in particular at least 85% by weight, for example at least 90% by weight. It is even possible to produce an aqueous stream having a concentration of 95% by weight of hemicellulose of the dry matter content.

In one embodiment, the aqueous stream containing dissolved hemicelluloses, obtained by any of the above described embodiments, is conducted to a step wherein the concentration of the hemicelluloses is increased.

In one alternative, such an aqueous stream containing dissolved hemicelluloses is conducted to membrane filtration, for example ultra-filtration In particular, by increasing the concentration of hemicelluloses, the consistency of the aqueous stream is increased to a value of at least 1% by weight, for example at least 3% by weight, such as at least 5% by weight and up to 25% by weight.

Based on the above, one embodiment of the invention comprises the following a method of extracting hemicelluloses from a hemicellulose containing raw-material:
  providing, at a temperature in excess of 120° C., a hemicellulose extract in the form of an aqueous stream containing dissolved hemicelluloses and dispersed colloidal substances,
  adjusting the temperature of the aqueous stream to a temperature of 120° C. or less, in particular to a temperature of 100 to 70° C.;
  contacting the aqueous stream with a material capable of adsorbing dispersed colloidal substances, so as to provide an aqueous solution of hemicelluloses which is freed from dispersed colloidal substances, and
  optionally conducting the aqueous stream containing dissolved hemicelluloses to a step wherein the concentration of the hemicelluloses is increased.

The hemicellulose extract in the embodiment is preferably obtained by contacting the raw-material with an aqueous medium selected from water and steam and a combinations thereof.

EXAMPLES

Example 1

Hemicelluloses were extracted from birch chips according to the method described in WO2014009604 to produce hemicellulose extracts.

The hemicellulose purity of the extract was 95%, however, the turbidity of the cool extract (below 30° C.) was above 1500 NTU. The temperature of the extract inside the reactor was cooled down and below 120° C. whereupon the extract started to clear from the turbidity causing material.

FIG. 1 shows the reading from a flow meter as a function of time. The temperature of the flowing hemicellulose extract is also indicated. It should be noted that FIG. 1 shows the response from the flow meter which started to gain a deposit of the turbidity causing material, hence an error reading from the device appeared even though the flow of the extract was constant.

The hemicellulose extract obtained as explained above was being cooled down and circulated at constant speed through a reactor containing wood chips from which the hemicelluloses have been extracted. As the temperature of the extract reached 120° C. the flow meter started to show a lower reading since tacky material was being deposited onto the surfaces of the flow meter. The deposition was increasing all the way until no change in the deposition tendency could be noticed at a temperature of approximately 85° C.

In this example, although a lowering of the temperature to 120° C. already gave some clarification of the hemicellulose extract, particularly good results were obtained when the extract was cooled over a temperature interval from approximately 120° C. down to ca. 80° C. or lower in order to reach complete clarification.

After the temperature of the extract had reached a temperature of 70° C. the residual turbidity of the cool extract was below 40 NTU.

Example 2

Figure 2:
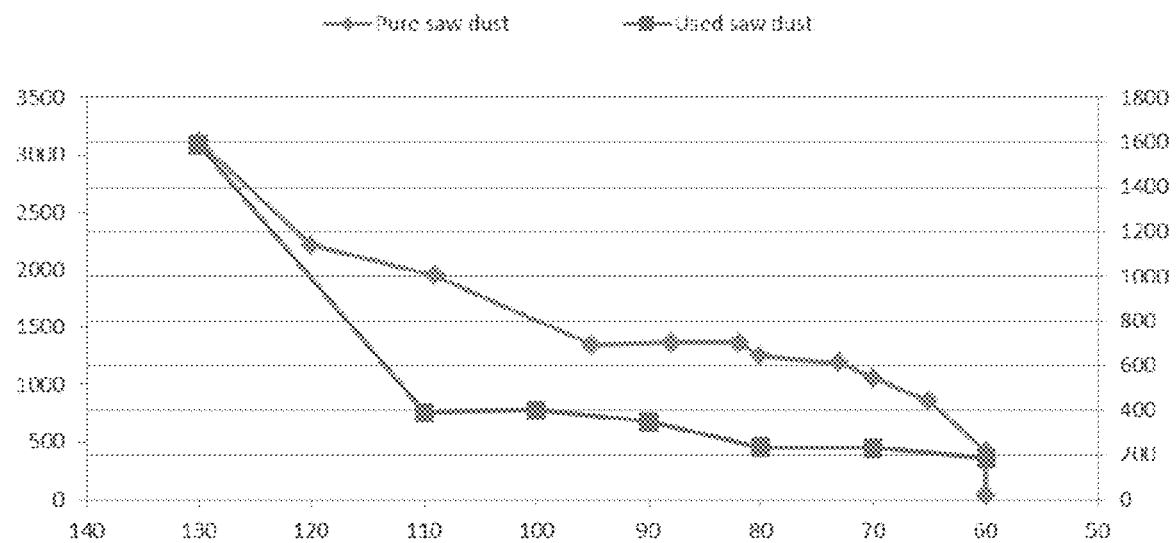
FIG. 2 shows the residual turbidity of extracts cooled to below 30° C. as a function of temperature.

A hemicellulose extract with a hemicellulose content of approximately 90% was extracted from birch chips. The extract was heated to above 120° C. and a cooling sequence was initiated by letting cold tap water cool the piping before a container filled with saw dust from birch wood. As the temperature lowered below 120° C. the turbidity causing material began to deposit onto the saw dust. The temperature was lowered down to 64° C. whereupon the extract was pumped out from the system. The turbidity decrease is shown in FIG. 2 as the graph named "pure saw dust".

Hemicellulose extract with a hemicellulose content of approximately 90% was extracted from birch chips. The extract was heated to above 120° C. and a cooling sequence was initiated by letting cold tap water cool the piping before a container filled with saw dust from birch wood. As the temperature lowered below 120° C. the turbidity causing material began to deposit onto the saw dust. In this trial the saw dust was material used in the example above, therefore containing the deposited material from the last experiment. The temperature was lowered down to 64° C. whereupon the extract was pumped out from the system. The turbidity decrease is shown in FIG. 2 as the graph named "used saw dust". The rate at which the residual turbidity decreased, using an adsorption material having a prior deposited turbidity causing material, was much faster.

The graphs consist of two trials where the same extract was purified by depositing the turbidity causing material in a saw dust packed filter. In the first trial the filter was packed with pure saw dust and the second trial contained saw dust which already had been used for the purification of an earlier batch of hemicellulose extract. It is clear from the graph that material already having deposited material increases the purification process.

In this experiment the hemicellulose extraction was altered from the method described in WO2014009604 in order to produce a hemicellulose extract with a lower purity. Extracting the hemicelluloses without a prior vacuum treatment greatly lowers the purity of the extract. The hemicellulose purity of the three extracts was 80%, 90% and 95%, where the difference between the 90% and 95% purity extracts was the process of depositing the turbidity causing material onto saw dust in a temperature interval between 120-70° C. The material causing the impurity causes the turbidity of the cooled extract to increase. The corresponding turbidities were 5000 NTU, 1500 NTU and 40 NTU.

Example 3

Figure 3:
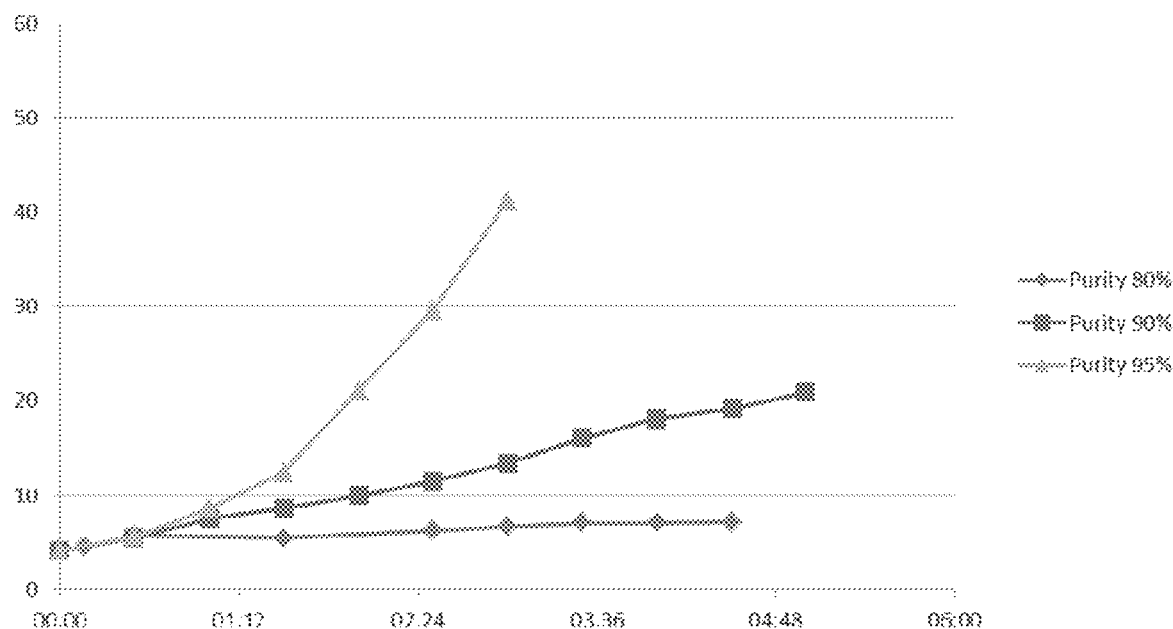
FIG. 3 shows the consistency increase of three different hemicellulose extracts with the hemicellulose purities of 80%, 90% and 95%.

FIG. 3 shows the consistency increase as a function of time with the three extracts of Example 2, with hemicellulose purities of 80%, 90% and 95%. From the results it is clear that for an extract with higher purity and low turbidity the ultra-filtration becomes much faster.

The purity of the hemicellulose extract significantly increases the efficiency of an ultrafiltration process in order to increase the consistency of a hemicellulose extract.

The purest extract was also purified from the unwanted turbidity increasing components by circulating the hemicellulose extract through the wood chips, from where they were extracted from, at the same time as the temperature of the extract was cooled below 120° C.

In this experiment the temperature of a cooled hemicellulose extract (below 30° C.) was raised to 130° C. followed by a controlled temperature decrease from 120° C. down to 65° C. The extract was circulated through a saw dust containing vessel. Samples were extracted from the process in order to evaluate the amount of hemicelluloses in the extract. The residual (cooled extract below 30° C.) turbidity of the extract lowered from 2000 NTU down to 40 NTU during the process.

FIG. 4 shows the hemicellulose content of the extract and reveals that hemicelluloses are not deposited or removed from the extract during the process. FIG. 4 shows that the hemicellulose content of the extract does not alter during the purification process from the unwanted turbidity causing material. The turbidity of the extract lowered from 2000 NTU down to 40 NTU during the process without any significant lowering of the hemicellulose content in the extract.

Example 4

During the removal of turbidity causing material it is preferred to maintain pH of the extract in a pH range at which hydrolysis of hemicelluloses is essentially avoided.

Hemicelluloses were extracted from birch chips according to the method described in WO2014009604 to produce hemicellulose extracts.

Figure 5:
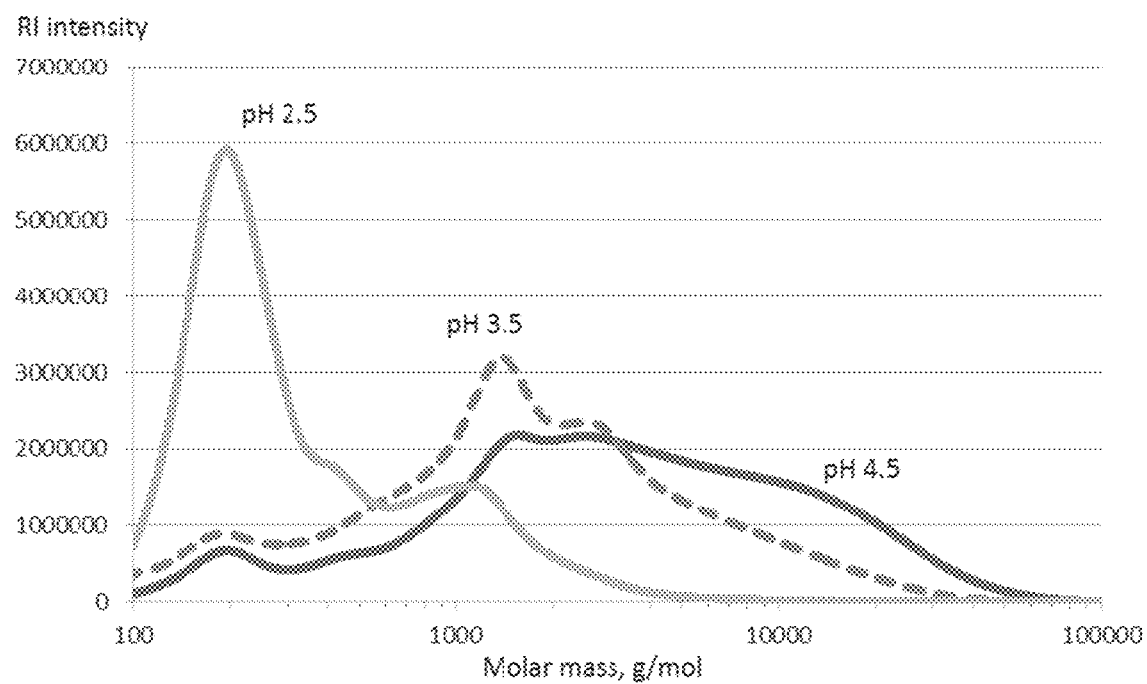
FIG. 5 shows the molar mass distribution of hemicellulose extracts clarified at different pH 2.5, 3.5 and 4.5.

FIG. 5 shows the molar mass distribution of hemicellulose extracts obtained by a clarified at different pH 2.5, 3.5 and 4.5.

As will appear, at a pH in the low end of the pH range from 2.5 to 4.5 extensive hydrolysis is caused. As a result, significantly lower yield is reached by filtration for example with a typical filter cut off of 2000 g/mol.

INDUSTRIAL APPLICABILITY

The described method for purification of a hemicellulose extract enables the efficient use of a filtration system in which the concentration of the extract is increased. The turbidity causing material clogs for example ultrafiltration membranes which makes the use of such technique impossible in industrial scale. As mentioned above, the method can be used for removing lignin from prehydrolysates of present pulping process to produce purified hemicellulose compositions having a purity in respect of hemicellulose of more than 95% by weight of the total weight of dissolved solid material.

The present invention can be used for hemicellulose extracts of various sources. One application is formed by extracts obtained by pressurized hot water extraction of biomass, in particular lignocellulosic materials. Another application is formed by prehydrolysate of processes aiming at the production of dissolving pulp from biomass, in particular lignocellulosic materials.

CITATION LIST

Patent Literature

WO2014009604
WO2009122018
US2015376834

Non-Patent Literature

Leppänen et al.: Pressurized hot water extraction of Norway spruce hemicelluloses using a flow-through system, *Wood Sci Technol* (2011) 45:223-236;

Strand, Elsi: Enhancement of Ultrafiltration Process By Pretreatment in Recovery of Hemicelluloses from Wood Extracts, 2016, ISBN 978-952-265-894-4

The invention claimed is:

1. A method of extracting hemicelluloses from a hemicellulose containing raw-material comprising:
    contacting the raw-material with an aqueous medium at a first temperature of up to 250° C. to provide a hemicellulose extract in the form of an aqueous stream containing dissolved hemicelluloses and dispersed colloidal substances;
    adjusting the temperature of the aqueous stream to a second temperature of 70 to 120° C. to tackify the dispersed colloidal substances; and
    at the second temperature of 70 to 120° C., contacting the aqueous stream with a material that adsorbs the tackified dispersed colloidal substances on the material, so as to provide an aqueous solution of hemicelluloses, having a residual turbidity, measured at room temperature, of below 200 NTU.

2. The method according to claim 1, comprising providing an aqueous solution of hemicelluloses, having a residual turbidity, measured at room temperature, of below 100 NTU.

3. The method according to claim 1, comprising lowering the pH of the aqueous stream before or during the step of contacting the aqueous stream with a material capable of adsorbing dispersed colloidal substances, in particular adjusting the pH to a value of less than 10.

4. The method according claim 1, comprising contacting the aqueous stream with a material capable of adsorbing dispersed colloidal substances at turbulent flow conditions.

5. The method according to claim 1, comprising contacting the aqueous stream with a material selected from the group of biomass, lignocellulosic and cellulosic pulp, paper and paperboard optionally in shredded or finely divided form, mineral particles, polymeric particles and non-porous materials having smooth or rough surfaces.

6. The method according to claim 1, comprising
    contacting the aqueous stream with the material having a specific surface area of at least 10 m$^2$/g, or
    contacting the aqueous stream with a three-dimensional construction having a specific surface area of at least 50 m$^2$/m$^3$, or
    a combination of both.

7. The method according to claim 1, comprising contacting the aqueous stream with the material comprising colloidal substances deposited on at least a part of its surface.

8. The method according to claim 1, comprising achieving or enhancing separation of dispersed colloidal substances by subjecting the substances to centrifugal forces, wherein the colloidal substances are separated from the solution and adsorbed onto a surface due to centrifugal forces.

9. The method according to claim 1, wherein an agent enhancing precipitation of colloidal substances is added to the aqueous stream before or during the step of contacting the aqueous stream with the material capable of adsorbing dispersed colloidal substances.

10. The method according to claim 1, wherein a chelating agent or any acid capable of chelation is added to the aqueous stream at a temperature of about 100° C.

11. The method according to claim 1, wherein the second temperature of the aqueous stream is adjusted to a temperature in the range of 65 to 120° C.

12. The method according to claim 11, wherein the second temperature of the aqueous stream is lowered first to 120° C. and then lower than that down to a temperature of no higher than 85° C.

13. The method according to claim 1, wherein the aqueous stream containing dissolved hemicelluloses is conducted to a step wherein the concentration of the hemicelluloses is increased.

14. The method according to claim 13, wherein the aqueous stream containing dissolved hemicelluloses is conducted to membrane filtration.

15. The method according to claim 1, comprising removing from the aqueous stream colloidal substances which primarily comprise of lignin and other phenolic compounds.

16. The method according to claim 1, comprising providing an aqueous stream containing hemicelluloses and having a residual turbidity caused by lignin or other phenolic compounds, measured at room temperature, of below 100 NTU.

17. The method according to claim 1, comprising providing an aqueous stream containing dissolved hemicelluloses selected from the group of xylanes.

18. The method according to claim 1, comprising providing an aqueous stream containing 0.01 to 20 wt-% of dissolved hemicelluloses.

19. The method according to claim 1, wherein hemicelluloses are extracted from the raw-material by extraction carried out at a temperature of 70-250° C.

20. The method according to claim 1, wherein hemicelluloses are extracted from the raw-material by hot water extraction carried out at a pressure of 1.5 to 10 bar(a) and a temperature in the range of about 130 to 160° C. to provide a hemicellulose extract in the form of an aqueous stream containing dissolved hemicelluloses.

21. The method according to claim 1, wherein the raw-material is selected from the group of lignocellulosic materials and cellulosic materials.

* * * * *